United States Patent [19]

Buddendeck

[11] 4,456,237
[45] Jun. 26, 1984

[54] PLURAL MODE RECIRCULATING DOCUMENT HANDLER

[75] Inventor: Mark H. Buddendeck, Macedon, N.Y.

[73] Assignee: Xerox Corporation, Stamford, Conn.

[21] Appl. No.: 316,694

[22] Filed: Oct. 30, 1981

[51] Int. Cl.³ .............................................. B65H 5/22
[52] U.S. Cl. ..................................... 271/3.1; 271/186; 271/291; 271/301
[58] Field of Search ................... 271/3, 3.1, 186, 291, 271/301

[56] References Cited

U.S. PATENT DOCUMENTS

| | | | |
|---|---|---|---|
| 3,612,249 | 10/1971 | Schneider | 271/DIG. 9 |
| 4,066,252 | 1/1978 | Wick | 271/3 |
| 4,089,515 | 5/1978 | Stange et al. | 271/3 |
| 4,109,903 | 8/1978 | Stange et al. | 271/3 |
| 4,140,387 | 2/1979 | Gustafson | 355/14 |
| 4,158,500 | 6/1979 | DiFrancesco et al. | 355/14 |
| 4,176,945 | 12/1979 | Holzhauser et al. | 355/23 |
| 4,223,886 | 9/1980 | Vogt | 271/DIG. 9 |
| 4,229,101 | 10/1980 | Hamlin et al. | 355/77 |
| 4,234,180 | 11/1980 | Looney | 271/3.1 |
| 4,238,126 | 12/1980 | Langdon | 271/3.1 |
| 4,262,895 | 4/1981 | Wenthe, Jr. | 271/65 |
| 4,269,406 | 5/1981 | Hamlin | 271/108 |
| 4,278,344 | 7/1981 | Sahay | 355/14 SH |
| 4,319,833 | 3/1982 | Hidding | 355/23 |

FOREIGN PATENT DOCUMENTS

| | | | |
|---|---|---|---|
| 52-29071 | 3/1977 | Japan | 271/3.1 |

*Primary Examiner*—Richard A. Schacher

[57] ABSTRACT

A recirculating document handling apparatus and method for plurally recirculating original document sheets to and from a stack thereof and to and from the imaging station of a copier for providing precollation copying, providing selected ones of different but compact and partially shared document recirculation loop paths within a common loop path, selected depending on the copying mode selected with path selector means.

4 Claims, 5 Drawing Figures

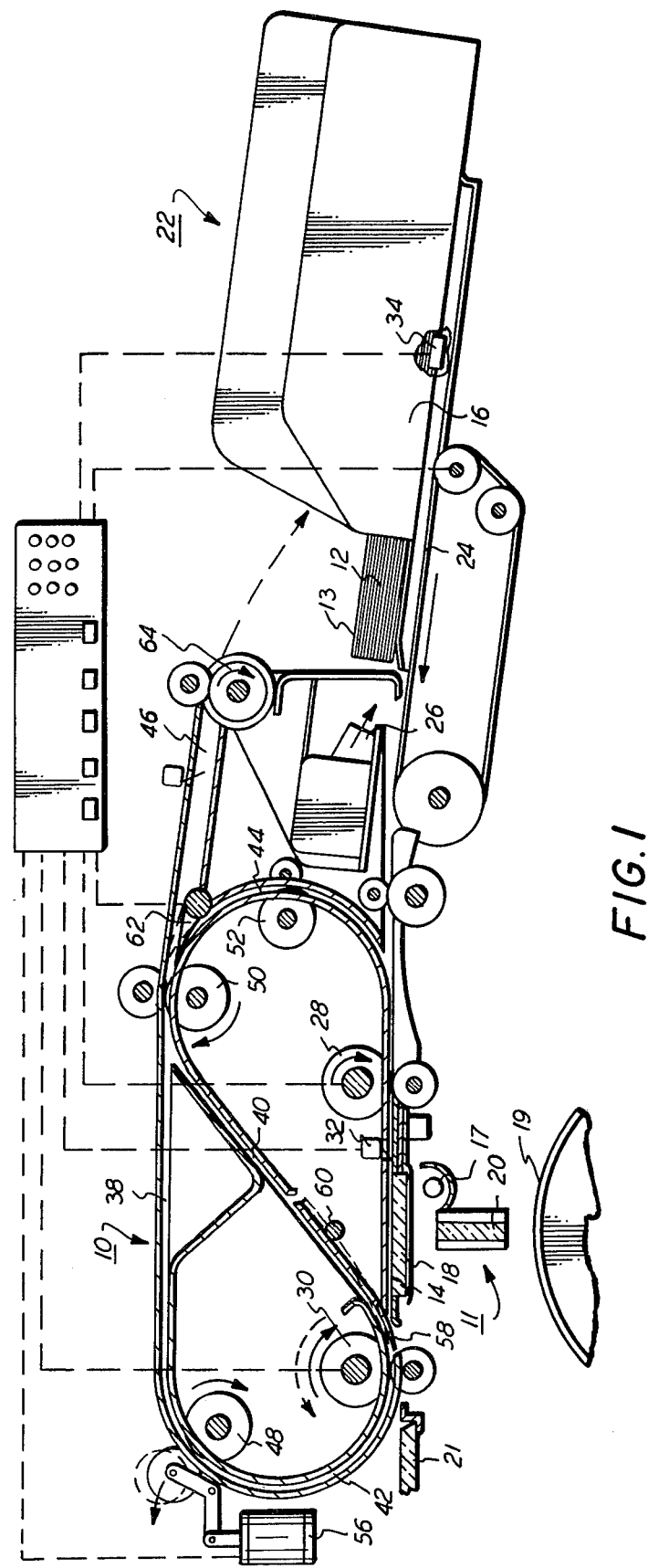

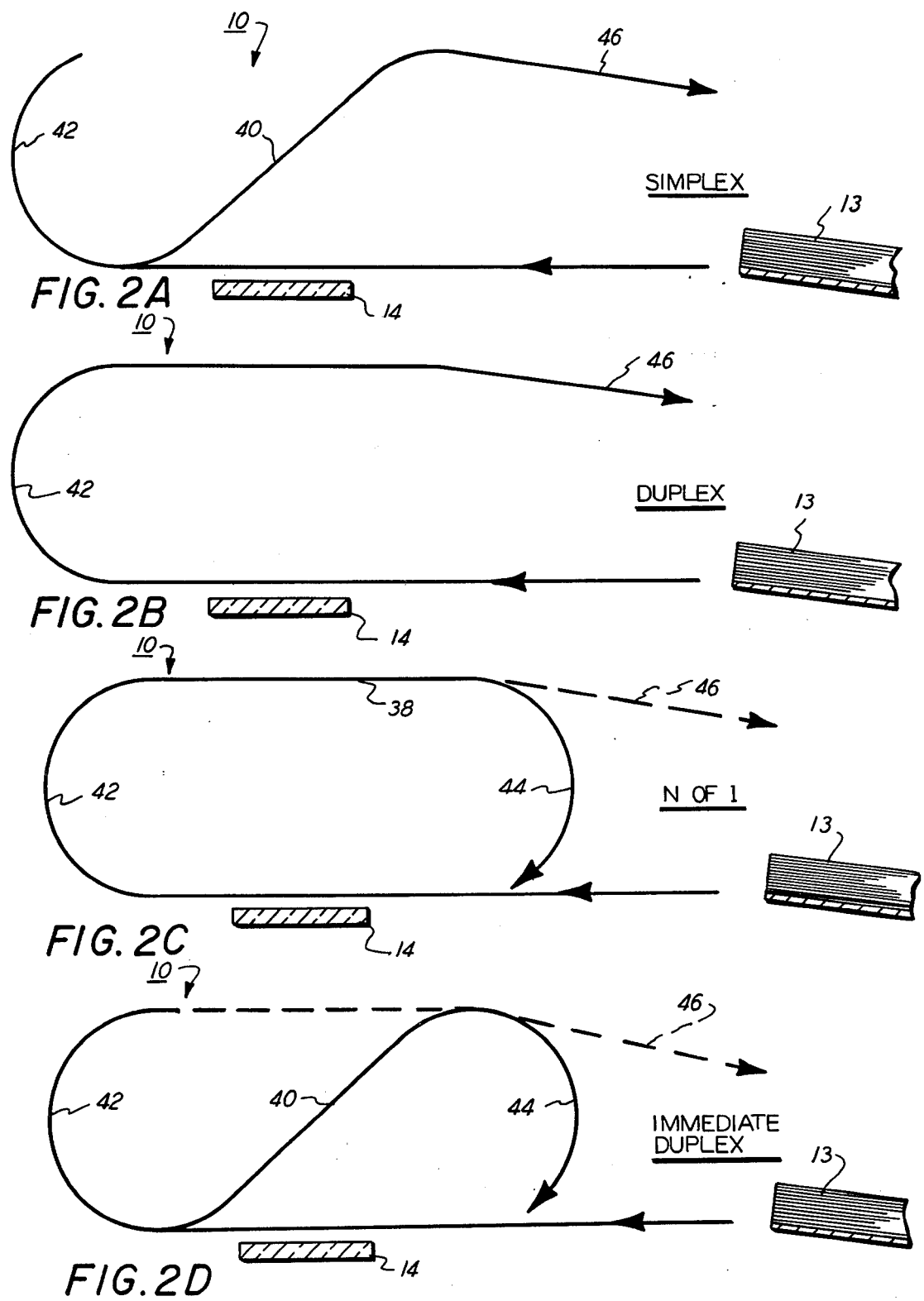

PLURAL MODE RECIRCULATING DOCUMENT HANDLER

The present invention relates to a plural-mode recirculating document handler for recirculating original document sheets from a stack thereof to an imaging station of a copier for copying with selected document recirculation loop paths depending on the copying mode selected.

Especially for the faster xerographic and other document copiers now in commercial use, it is increasingly desirable to provide for the automatic handling of the individual original document sheets being copied, in order to more fully utilize the higher copying speed capabilities of these copiers. It is particularly desirable to rapidly automatically feed, register and copy document sheets of a variety or mixture of sizes, types, weights, materials, conditions and susceptibility to damage, yet with minimal document jamming, wear or damage by the document handling apparatus. Yet it is also desirable that the document handling units be as compact, simple and lightweight as possible. This is especially desirable where, as conventionally practiced, the entire document handling unit is pivotally mounted over the existing copier platen to be liftable by the operator to facilitate alternative manual document placements on the platen.

A known desirable feature for an automatic document handling system for a copier is to provide document recirculations for precollation copying. Such precollation copying systems provide a number of important advantages. The copies exit the copier into a set collector already in precollated sets, and do not require subsequent sorting in a sorter or collator. On-line finishing and/or removal of completed copy sets may be provided while additional copy sets are being made from the same document set. Also, a complete copy proof set is available from the first document set circulation. Any desired number of such copy sets may be made by making a corresponding number of recirculations of the document set in collated order past a copying station and copying each document once each time it recirculates. Examples of such systems are further described in the patent literature cited hereinbelow.

However, a disadvantage of precollation copying systems is that the documents must all be repeatedly recirculated and repeatedly individually copied a number of times equivalent to the desired number of copy sets. For example, to make 10 copy sets of a 5 page document set or book, one copy at a time can be made of each of the 5 document pages in this order: pages 1, 2, 3, 4, 5; 1, 2, 3, 4, 5; (or the reverse page order) repeated a total of 10 times to make the desired 10 copy sets. Thus, increased document recirculations are necessitated for a precollation copying system, with consequent increased likelihood of document jams and document wear, image smearing, or damage, particularly if the document feeding paths are lengthy, interrupted, or excessively arcuate.

The type of document transport and registration system is affected by the type of copier optics, i.e., the copying system. In the known constant velocity transport (CVT) system a moving document is copied with a stationary optics system. The document sheet is fed by wheels or belts at a constant velocity over a narrow transparent scanning slit, window or platen of a copier. This is desirable for a small copier since the overall system can be much more compact. However, such a CVT system can also be combined into a copier also providing a full size stationary platen by using a part of the full platen to provide the CVT scanning slit. This has been used to provide for alternative CVT document "stream feeding", or for feeding documents which are larger than the platen, e.g., the Xerox "3100 LDC" copier (e.g., U.S. Pat. Nos. 3,900,258 and 4.017,172)

It is generally preferable in such a CVT system to preregister the document to its transport just before the document is transported over the copying window. Examples are disclosed in the above patents or in U.S. Pat. No. 3,536,320 issued Oct. 27, 1970 to D. R. Derby.

In contrast, in many other copying systems or modes, the document is registered overlying a full document sized (full frame) platen, and either optically scanned by moving scanning optics while it is held stationary over the platen or optically stopped by flash illumination and imaging of the entire document when the document is driven by the document transport to the registration position over the platen. Examples are disclosed in patents cited below.

Of particular interest as disclosing a recirculating document handler for a copier with a stack at one side of an imaging station and means for returning the document through alternative paths to the stack inverted or not inverted for duplex or simplex precollation copying, are U.S. Pat. Nos. 4,238,126 issued Dec. 9, 1980 to M. J. Langdon; 4,234,180 issued Nov. 18, 1980 to J. H. Looney; and 4,229,101 issued Oct. 21, 1980 to T. J. Hamlin et al. (the latter also disclosing CVT imaging, and plural circulation of a single document in Col. 11, lines 46–52). Other duplex or simplex recirculating document handlers are disclosed, for example, in U.S. Pat. No. 4,278,344 issued July 14, 1981 to R. B. Sahay; U.S. Pat. No. 4,269,406 issued May 26, 1980 to T. J. Hamlin; U.S. Pat. No. 4,176,945 issued Dec. 4, 1979 to R. C. Holzhauser, et al.; U.S. Pat. No. 4,158,500 issued June 19, 1979 to A. B. DiFrancesco et al.; and U.S. Pat. No. 4,140,387 issued Feb. 20, 1979 to G. B. Gustafson et al.; and U.S. Pat. No. 4,089,515 issued May 16, 1978 and U.S. Pat. No. 4,109,903 issued Aug. 29, 1978, both to Klaus K. Stange, et al. A simplex document recirculating handler and diagnostics therefor is disclosed in U.S. Pat. No. 4,206,995 issued June 10, 1980 to E. L. Legg. Examples of non-recirculating (single) duplex moving document copiers with reversing document movement are disclosed in U.S. Pat. No. 4,066,252 issued Jan. 3, 1978 to R. Wick and Japanese Application No. 47-49718 filed May 19, 1972 and laid open Feb. 9, 1974 as No. 49-15435. A curved chute duplex document inverter is detailed in U.S. Pat. No. 4,262,895 issued Apr. 21, 1981 to S. J. Wenthe, Jr.. Cross-reference is also made to copending U.S. application Ser. Nos. 314,633 (allowed) and 314,801 (allowed), filed Oct. 23, 1981 by Gerald A. Buddendeck, Karl M. Kau, and William G. Gerken, respectively, with the same assignee.

The art also includes various other patents teaching document handlers and also control systems therefor, such as U.S. Pat. Nos.: 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270.

Conventional simple software instructions in the copier's general microprocessor logic circuitry and software of document handler and copier control functions and logic, as taught by the above and other patents and various commercial copiers, are well known and preferred. However, it will be appreciated that the document feeding functions and controls described herein may be alternatively conventionally incorporated into a copier utilizing any other suitable or known simple software or hand wired logic systems, cam-bank switch controllers, etc.. With the present system, both document feeding and copying thereof can be initiated simply by a known document lead edge detector switch actuated as the document sheet is being inserted. See, e.g., the above-cited U.S. Pat. No. 4,132,401 issued Jan. 2, 1979 to J. F. Gauronski et al. and the references cited therein.

All references cited herein, and the references cited therein, are also incorporated by reference herein for appropriate teachings of additional or alternative details, features, and/or technical background.

The present invention overcomes or reduces various of the above-discussed problems. A preferred feature of the invention disclosed herein is to provide integral plural-mode document recirculation loop path means with path selector means therefor providing selected different document recirculation loop paths, depending on a selected copying mode, including an oval loop recirculation path over said imaging station; and means for selectably feeding document sheets into and out of said oval loop recirculation path after at least partial circulation therein; said integral plural-mode document recirculation loop path means further including an additional S-shaped document recirculation path, which S-shaped path is within said oval loop recirculation path and partially in common therewith and returns documents to said imaging station for copying the opposite sides thereof.

Further features which may be provided by the recirculating document handler disclosed herein include those in which said integral plural-mode document recirculation loop path means includes an integral inverter/return loop document path common to both said oval loop path and said S-shaped path, which inverter/return loop path provides a document sheet reversing and non-inverting temporary storage chute in at least one said copying mode and provides a non-reversing and inverting document return path therethrough in at least one other said copying mode, or in which said inverter/return loop document path is an integral one side of said oval document recirculation loop and includes selectively reversible sheet feed means; and in which said document recirculation loop path means further includes an alternative transverse loop-intersecting bypass path communication with the entrance of said inverter/return loop path, said bypass path forming a central portion of said S-shaped path, and wherein a document sheet may be selectively unidirectionally fed through said inverter/return loop path or reversed in said inverter/return loop path by said reversible sheet feed means and fed into said bypass path.

Further features and advantages of the present invention pertain to the particular apparatus and steps whereby the above-mentioned and other features and advantages may be attained.

The invention will be better understood by reference to the following description of a specific example thereof, which includes the following drawing figures (approximately to scale) wherein:

FIG. 1 is a cross-sectional side view of an exemplary document handling apparatus in accordance with the present invention on an exemplary copier (partially shown); and FIGS. 2A–2D schematically show the document paths for four different modes of operation of the document handling unit of FIG. 1.

Referring to the embodiment of FIGS. 1 and 2, an exemplary constant velocity transport (CVT) document handling unit 10 is mounted on an exemplary copier 11. The unit 10 feeds individual original document sheets 12 seriatim from the bottom on a stack 13 in a constant velocity movement path over the transparent copying window or platen 14 of the copier 11. The unit 10 also transports documents from the platen 14 back to the top of the stack 13. The stack 13 is in a stack holder or tray 16 adjacent one side of the platen 14. The documents are loaded face down and generally fed in 1-N or forward serial page order in a short and substantially linear path directly from the bottom of the stack 13 to the platen 14.

Since the copier 12 may be any of various known types such as those in the patents cited above, its example here is disclosed only to the extent of the document handler 10 optical interface therewith. Here each document sheet 12 is preferably conventionally exposed on the platen 14 by an illumination lamp 17 or lamps and a light reflector therefor under the platen. The flowing slit image of that portion of the document thus uniformly illuminated which is within an imaging or viewing area 18 (in a central portion of platen 14) is conventionally focused onto the copier photoreceptor 19 through a stationary lens 20. Here the lens 20 is a self-focusing linear optical fiber array as described, for example, in U.S. Pat. No. 3,977,777. This flowing light image on the photoreceptor 19 may then be conventionally developed and transferred to a registered copy sheet, as further described in the above-cited references. As discussed above, the lamp 17 and lens 20 may be permanently fixed, or may be only temporarily locked in this position and otherwise movable to scan a full size platen contiguous or adjacent the imaging area 18. Here a portion (one edge) of such an adjacent full platen 21 is shown.

The side of the document parallel the direction of document motion may be initially registered against, and guided along, an edge guide 22 in the stack holder 16. The initial registration of the lead edge of document to the other (orthogonal) axis, an imaginary line transverse the direction of document motion, can be done in several ways. Here it is conventionally accomplished simply by aligning (abutting) the lead edge of the document sheet with sheet feed rollers, that is, against a plural roller transvere nip line. As discussed above, a document sheet lead edge detector switch may be activated as this is done to initiate the operation of both the document handler 10 and copier 11 in a known manner.

This initial separation and feed-in of each document sheet 12 from the stack 13 may be done by a corrugating vacuum belt bottom feeder 24 assisted by an air knife system 26, shown in U.S. Pat. No. 4,284,270 issued Aug. 18, 1981 to M. Silverberg, for example.

The transport 10 provides a CVT with no changes in driving velocity while the document is being driven over the optical scan slit 18. Here the constant velocity line nip from aligned rubber rolls 28 and mating idler rollers thereunder catches and drives the lead edge of the document upstream of (before) the document enters the scan slit 18. This nip drives the document over the scan slit 18. On the other side of the imagining area 18 is a similar set of equal speed rollers 30 which continue the document sheet movement until it is all imaged.

Switch 32, connected to the copier microprocessor controller 36, is activated by the document lead edge slightly before the document enters the imaging area 18. That, and/or paper path switches, including conventional set counter (bail) and stack sensor switches 34, may be used to initiate the operation of the copier as well as counting the number of documents copied. Switch 32 may also be used to sense the eminent passage of the trail edge of the document through the imaging station for other controls, including the timing of document reversal in certain operating modes as described below.

Considering now the overall configuration of the document handling unit 10, it may be seen that other than the separable stack tray 16 and input feeder assembly 24,26, the unit 10 comprises a very compact and short path racetrack or flattened oval looped path baffle and feeder unit. A complete or closed loop racetrack path 38 is provided enabling continuous recirculation of a sheet in one direction from and back to the imaging slit 18. It provides a total racetrack path length preferably less than twice the document sheet dimension in its feeding direction. The racetrack path 38 includes two 180° (semi-cylindrical) sheet inverting loop paths 42 and 44 at opposite ends of the racetrack. In addition to this outside or racetrack path 38 there is provided here a diagonal cross-path 40, internally bisecting and connecting with the outer racetrack path 38. The cross-path 40 connects between the bottom entrance of loop path 42 and the top entrance of loop path 44. Further an output (restack) path 46 from path 38 connects (at the opposite side of the top of path 44) with path 40. The path 42 here provides an integral inverter/return loop path in which the same, common, path 42 provides in certain copying modes a compact, curved, sheet reversing and non-inverting temporary storage chute for sheets fed in and out of one end thereof; and in other copying modes the same path 42 provides a non-reversing and inverting document path therethrough. All of these paths are short and interconnecting for rapid document circulation without requiring high velocity document movements. Further, all document sheet movements are gentle transitions, i.e., there are no undesirable sharply arcuate (small radius) turns or inversions in any of these document paths, even though the overall size of the unit is quite small.

The above-described paths and their associated feed rollers provide a recirculating document handler 10 for recirculating document sheets to and from the stack 12 thereof to and from the imaging station 18 of the copier 11 with a selection of document recirculation loop paths to provide a plurality of modes of operation, i.e., plural document circulation modes, as illustrated in FIGS. 2A-2D. That is, different ones of interconnecting integral, short, document recirculation looped paths may be selected, and in different sequences, depending on the desired copying mode selected.

The overall document recirculating path unit 10 thus provides not only a completed contiguous oval document recirculation loop 38 directly over the imaging station 18, but also reversing means and an alternative transvere intersecting bypass path 40. It may be utilized for selectably recirculating a document sheet in the recirculation loop 38, or reversing a document sheet at one side 42 of the loop 38 and/or feeding it into the selectable bypass path 40 for recirculation through path 44 back to the imaging station 18, or ejection through path 46.

It will be noted that here the copier imaging station is only a narrow optical scanning slit underlying only a minor portion of the document recirculation loop path 38, adjacent the one end 42 thereof. Further, the document feeding wheels 28, 30 for feeding document sheets over the imaging station at a constant speed for imaging same are also an integral part of, and provide part of the sheet movement in, the recirculation path 38.

With the exception of only feed rollers 30 when they reverse in the operating modes in which sheet movement reversal there is selected, all of the other document feeding rollers disclosed in unit 10 may be commonly and unidirectionally driven. Here this includes rollers 28, rollers 48 (at the upper end of loop path 42) rollers 50 (at the top of paths 40 and 44 and the entrance to path 46) and rollers 52 (centrally of path 44). All these rollers are within less than one sheet length (or width) of one another so that a sheet is constantly engaged by at least one set of driven rollers and its mating idler rollers. The exception is rollers 48. There its idler rollers 54 are engageable and disengageable by a solenoid 56. When the document is to be reversed in path 42, where path 42 is serving as a compact reversing (non-inverting) chute, then the solenoid 56 is temporarily actuated to open the nip with driven rollers 48 and allow slippage (non-engagement) with the document sheet. That allows the reversal of rollers 30 to reverse the direction of document motion unobstructedly. Here that reversal, when selected, occurs after the trail edge of the document has passed a pivotable deflector gate 58. This is an automatic one-way gate. It allows document sheets to feed in one direction from the imaging station 18 into the loop path 42 by the lead edge of the document deflecting the gate 58 up out of the way. However, on the reversed movement of the document sheet from the loop path 42 back towards the imaging station 18, the sheet is automatically deflected up into the entrance of bypass document path 40 (leading away from the imaging station) by the upper surface of gate 58, which has dropped down into the sheet path (illustrated solid line position). This automatic one-way deflection gate 58 is gravity operated, i.e., gate 58 swings down about its pivot axis 60 into said deflecting position except when it is pushed up by a sheet passing thereunder from the imaging station 18.

At the opposite (downstream) end of bypass path 40, (and also in the loop 38 portion connecting between the upper (downstream) end of path 42 and the entrance to path 44) is a solenoid actuable two-way pivotable gate 62. The gate 62, if left down in the solid line position shown, causes sheets fed out from the downstream ends of either of paths 42 or 40 to be deflected into output path 46 and thereby restacked on stack 13, via the higher speed restack ejector rollers 64 in path 46. In contrast, when gate 62 is raised to its illustrated dashed-line position it deflects all sheets down into return loop path 44 leading directly back to the imaging station 18 with an inversion, via registration and feeding rollers 28, for recopying of the same sheet. However, whether the same side of the same sheet is so copied depends on whether the sheet was fed to path 44 by returning *through* path 42, or was *reversed* in path 42 and returned through path 40 instead. The former (as in FIG. 2C) return provides two sheet inversions (in paths 42 and 44) for recopying the same side of a document, whereas the latter (as in FIG. 2D) return to the imagining station provides only one inversion (in path 44) for copying the opposite side of the document.

Referring now particularly to FIGS. 2A through 2D, these illustrate schematically the document sheet paths for four different selectable modes of operation of the document handling unit 11. (These and additional copying modes and their respective advantages are further described in the above-cited patents).

Respectively, as so labeled, FIG. 2A illustrates a mode of operation for pre-collection copying of a set or stack of simplex (one-sided) original document sheets. FIG. 2B illustrates one mode of pre-collation copying a set of duplex (two-sided) document sheets. (See, e.g., above cited U.S. Pat. No. 4,229,101 for further copying details.)

FIG. 2C illustrates a known mode of making N (any selected plural number of) copies in direct sequence by the repeated circulation of a single document fed manually (or one document at a time) fed from a stack by the same feeder. In the latter case this will produce non-collated copies. In the case of a single document, there is, of course, no difference between pre-collation and post-collation copying, i.e., no collation is required. Thus, such immediate and direct recirculating loop copying of a single document is preferable, to as opposed to returning the document back to the stack support and back for each copy. This FIG. 2C mode can be automatically selected by the tray set counter and sensor switch detecting that there is only a single document present in the document tray. The dashed line in FIG. 2C indicates the return or ejection of the document after the desired number of recirculation loops (solid line) has been completed.

FIG. 2D illustrates another mode of pre-collation copying of a set of duplex document sheets. This copying mode is known as immediate duplex, (see, e.g., above cited U.S. Pat. Nos. 4,176,945 or 4,158,500 for further copying details) in that the first and second sides of each document sheet are copied immediately one after the other, rather than all of the first sides of each sheet in the whole set being copied at a time and then all of the other sides being copied, as in the FIG. 2B mode. In the FIG. 2D mode each document is reversed after copying one side and inverted and immediately returned to the imaging station for copying the second side (as shown in the solid lines) and then returned (as shown in the dashed line) to the tray for restacking.

Heretofore, the selection between a stack circulation duplex pre-collation mode, as in FIG. 2B, and an immediate duplex mode, such as in FIG. 2D, has not been practically achievable in a single integral document handler because of the different document paths required and the difficulty of providing such paths with appropriately short yet sufficiently large radius inversion loops so that the document handler can keep up with the copying rate of the copier and yet provide acceptable feeding with sufficiently low jam rates, and jam clearance accessiblity of the document transport.

In that regard it will be noted that the increased selectivity of operating modes provided with the document handling unit 10 also provides increased job recovery capabilities. For example, in the event of a document jam during copying, instead of recycling through the entire document set back to the particular document to be recopied for job recovery, the document to be recopied may be directly recycled in the FIG. 2C or FIG. 2D path modes to make an additional copy therefrom. That is, certain of the illustrated copying modes, even though not normally utilized for copying with a particular copies processor, may be specially utilized in the event of a document jam for making up additional copy sheets which are needed to complete incomplete copy sets, i.e., to replace sheets removed from the copier during the job recovery (jam clearance).

It may be seen that the selection of any of the above-described modes of operation, and others, can be accomplished, as exemplified here, simply by the actuation or non-actuation of the deflector gate 62 and the reversal or non-reversal of the feed wheels 30 (together with the actuation of the solenoid 56). This selection can provide for the alternatives of returning the document sheet through selected loop paths directly to the copying station, either inverted or not inverted, or further alternatively returning the document sheet directly back to the top of the stack 12, again, either inverted or not inverted, after copying only one side thereof, or after having copied both sides thereof, and after copying the document sheet once, or after the document sheet has been copied a plural number of times. Thus it may be seen that further and additional copying modes and/or job recovery modes are available in addition to those disclosed in FIGS. 2A through 2D.

Note, for example, that the FIG. 2B copying mode with its single natural inversion on path 42, will leave the stack 13 of documents inverted at the end of an odd number of document set circulations. By automatically switching to the FIG. 2A copying mode for the last document set circulation that can be avoided, i.e., the documents will restack in their initial orientation (face down).

It will be appreciated that the embodiments described are merely exemplary, and that other variations, modifications, refinements, or alternative embodiments may be provided by those skilled in the art. They are intended to be encompassed by the following claims.

I claim:

1. In a recirculating document handler for plurally recirculating simplex or duplex original document sheets to and from a stack thereof to and from the imaging station of a copier for providing precollation copying, with plural-mode document recirculation loop path means and path selector means therein providing selected different document recirculation loop paths, depending on a selected copying mode, including an oval loop recirculation path over said imaging station having two inverting loop paths, one at each end of said oval loop, and means for selectably feeding document sheets into and out of said oval recirculation path after at least partial circulation therein, the improvement wherein:
   said oval document recirculation loop path includes an integral alternative S-shaped document recirculation path for returning duplex documents to said imaging station for immediately copying the opposite sides thereof before return to said stack, wherein said S-shaped document recirculation path comprises both of said inverting loop paths and a bypass path transversely intersecting said oval loop providing an alternate path connecting between opposite ends of said two inverter loop paths and forming the central portion of said S-shaped path, and wherein for said S-shaped document recirculation path the duplex documents are reversed in one of said two inverting loop paths and fed through said bypass path to said other inverter loop path and then to said imaging station,
   and wherein alternatively a duplex document sheet may be unidirectionally fed through said one inverting loop path, rather than reversed therein, for direct, inverted, return to said stack.

2. The recirculating document handler of claim 1 in which said one inverting loop path providing document reversal also has automatic one-way deflection gate means for allowing document sheets to feed in one direction from said imaging station into said inverting loop path but automatically causing reversed movement document sheets fed from said one inverting loop path back towards said imaging station to be deflected into said bypass path.

3. The recirculating document handler of claim 2 in which said automatic one-way automatically deflection gate means is normally closed by gravity and is deflectable by the lead edge of a document sheet in only one direction of movement of said document sheet.

4. In a recirculating document handler for recirculating simplex or duplex document sheets from a stack thereof in a stack support to the imaging station of a copier and back to said stack support plurally for the production of plural precollated copies by said copier, the improvement comprising a compact plural-mode document loop recirculating means with one integral document inverting/non-inverting common loop path thereof being commonly utilized in all of said plural modes, wherein in a simplex document sheet copying mode the simplex document sheets are reversed in said common loop path by sheet reversing means therein and fed directly back to said stack support without any inversion of said document sheets in each circulation thereof, and wherein for duplex documents a selectable choices is provided in said document loop recirculation means of a first duplex mode of feeding said duplex document sheets through said common loop path for inversion thereby and returned to said stack support with only said one inversion, or a second duplex mode wherein said duplex document sheets are first reversed in said common loop path and then fed to a second loop path for inversion and then returned to said imaging station and then fed through said common loop path for a second inversion therein and then returned to said stack support with a total of said two inversions.

* * * * *